United States Patent
Men et al.

(10) Patent No.: US 12,330,564 B2
(45) Date of Patent: Jun. 17, 2025

(54) AUTOMATIC IR LED CONTROL FOR CAMERA MIRROR SYSTEM

(71) Applicant: Stoneridge Electronics AB, Solna (SE)

(72) Inventors: Yifan Men, Northville, MI (US); Liang Ma, Rochester, MI (US); Troy Cooprider, White Lake, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 39 days.

(21) Appl. No.: 17/979,285

(22) Filed: Nov. 2, 2022

(65) Prior Publication Data
US 2023/0150434 A1 May 18, 2023

Related U.S. Application Data (60) Provisional application No. 63/278,635, filed on Nov. 12, 2021.

(51) Int. Cl.
*B60R 1/28* (2022.01)
*B60R 1/30* (2022.01)

(52) U.S. Cl.
CPC .................. *B60R 1/30* (2022.01); *B60R 1/28* (2022.01); *B60R 2300/103* (2013.01); *B60R 2300/106* (2013.01)

(58) Field of Classification Search
None
See application file for complete search history.

(56) References Cited

U.S. PATENT DOCUMENTS

| | | | | |
|---|---|---|---|---|
| 2019/0143908 | A1* | 5/2019 | Koravadi | H04N 7/183 |
| | | | | 315/82 |
| 2020/0247331 | A1* | 8/2020 | Bigoness | B60R 11/04 |
| 2020/0267820 | A1 | 8/2020 | van den Brink et al. | |
| 2022/0343529 | A1* | 10/2022 | Ollila | G06V 40/193 |

FOREIGN PATENT DOCUMENTS

JP 5003593 B2 * 8/2012

OTHER PUBLICATIONS

European Search Report for European Application No. 22206810.8 mailed Mar. 16, 2023.

* cited by examiner

*Primary Examiner* — Samuel D Fereja
(74) *Attorney, Agent, or Firm* — Carlson, Gaskey & Olds, P.C.

(57) ABSTRACT

A camera monitor system includes a camera arm that has a camera with an image capture unit that is configured to capture an image of a desired field of view. A display is configured to display the desired field of view, and an IR LED illuminates at least a portion of the desired field of view. A controller is in communication with the image capture unit and the IR LED and select at least first and second regions of interest (ROI) from the captured image. The first ROI is indicative of an amount of ambient light. The controller determines a luminance of each of said first and second ROIs. The controller regulates an IR LED state of the IR LED based upon the first ROI luminance, and adjusts the IR LED state based upon the second ROI luminance.

17 Claims, 5 Drawing Sheets

AUTOMATIC IR LED CONTROL FOR CAMERA MIRROR SYSTEM

CROSS-REFERENCE TO RELATED APPLICATION

This application claims priority to U.S. Provisional Application No. 63/278,635 filed Nov. 12, 2021.

TECHNICAL FIELD

The disclosure relates to a CMS system using IR LEDs for night vision.

BACKGROUND

IR LEDs can be used to improve visibility for drivers in low light conditions. The IR LEDs are controlled so that they are not continuously ON to manage heat. Using camera monitor systems with night vision may result in situations where the image displayed in the vehicle to the driver is oversaturated such that the object or person is not clearly visible.

SUMMARY

In one exemplary embodiment, a camera monitor system includes a camera arm that has a camera with an image capture unit that is configured to capture an image of a desired field of view. The system further includes a display that is configured to display the desired field of view, an IR LED that is configured to illuminate at least a portion of the desired field of view, and a controller that is in communication with the image capture unit and the IR LED. The controller is configured to select at least first and second regions of interest (ROI) from the captured image. The first ROI is indicative of an amount of ambient light. The controller is configured to determine a luminance of each of said first and second ROIs. The controller is configured to regulate an IR LED state of the IR LED based upon the first ROI luminance, and the controller is configured to adjust the IR LED state based upon the second ROI luminance.

In a further embodiment of any of the above, the first and second ROIs correspond to different first and second portions of the same image, and the first ROI is above a horizon and skyward in the desired field of view, and the second ROI is aftward alongside a vehicle that has the camera monitor system.

In a further embodiment of any of the above, the image capture unit is configured to capture an RGB image, and the controller is configured to convert the RGB image of the first and second ROIs to HSV.

In a further embodiment of any of the above, the controller is configured to turn the IR LED to an ON state from an OFF state of the IR LED, or to an OFF state from the ON state.

In a further embodiment of any of the above, the controller is configured to change an amount of IR LED illumination other than an entirely ON IR LED state or an entirely OFF IR LED state.

In a further embodiment of any of the above, the controller is configured to regulate the IR LED state based upon a vehicle operating state, and includes a switch that has AUTOMATIC and MANUAL positions. The controller is configured to regulate the IR LED state in response to the switch being in the AUTOMATIC position.

In another exemplary embodiment, a method of automatically controlling a vehicle night vision system includes the steps of capturing an image in a desired field of view, selecting at least first and second regions of interest (ROI) from the captured image, the first ROI is indicative of an amount of ambient light, determining a luminance of each of said first and second ROIs, the first ROI is indicative of an amount of ambient light, regulating an IR LED state of an IR LED based upon the first ROI luminance, and adjusting the IR LED state based upon the second ROI luminance.

In a further embodiment of any of the above, the first and second ROIs correspond to different first and second portions of the same captured image.

In a further embodiment of any of the above, the first ROI is above a horizon and skyward in the desired field of view, and the second ROI is aftward alongside a vehicle that has the night vision system.

In a further embodiment of any of the above, the desired field of view includes both Class II and Class IV views.

In a further embodiment of any of the above, the image capturing step includes capturing an RGB image, and the luminance determining step includes converting the RGB image of the first and second ROIs to HSV (Hue, Saturation, Value).

In a further embodiment of any of the above, the luminance determining step includes calculating a median of the Value.

In a further embodiment of any of the above, the luminance determining step includes applying a low pass filter to the Value for each of the first and second ROIs.

In a further embodiment of any of the above, the low pass filter for each of the first and second ROIs is different from one another.

In a further embodiment of any of the above, the luminance determining step includes comparing the HSV Value to a desired luminance, and the IR LED state regulating step includes changing IR LED state only if the Value exceeds an offset from the desired luminance.

In a further embodiment of any of the above, the IR LED state regulating step includes automatically turning the IR LED to an ON state or an OFF state.

In a further embodiment of any of the above, the IR LED state adjusting step includes turning the IR LED to an ON state from an OFF state of the IR LED, or to an OFF state from an ON state.

In a further embodiment of any of the above, the IR LED state adjusting step includes changing an amount of IR LED illumination other than an entirely ON state or an entirely OFF state of the IR LED.

In a further embodiment of any of the above, the IR LED state regulating step is performed based upon a vehicle operating state.

In a further embodiment of any of the above, the method includes a switch having AUTOMATIC and MANUAL positions, wherein the IR LED state regulating step is performed in response to the switch being in the AUTOMATIC position.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
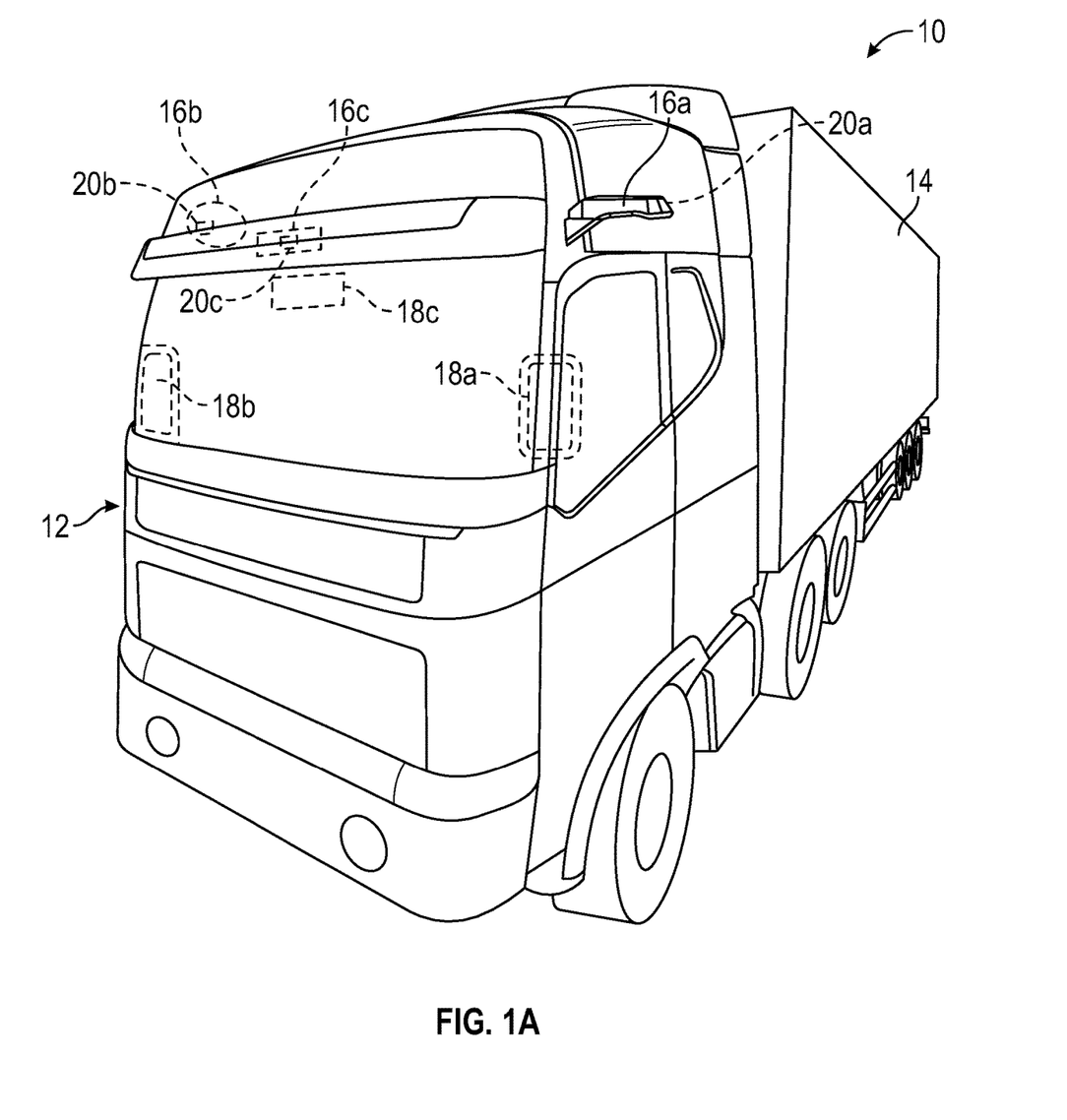
FIG. 1A is a schematic front view of a commercial truck with a camera monitor system (CMS) used to provide at least Class II and Class IV views.
Figure 1B:
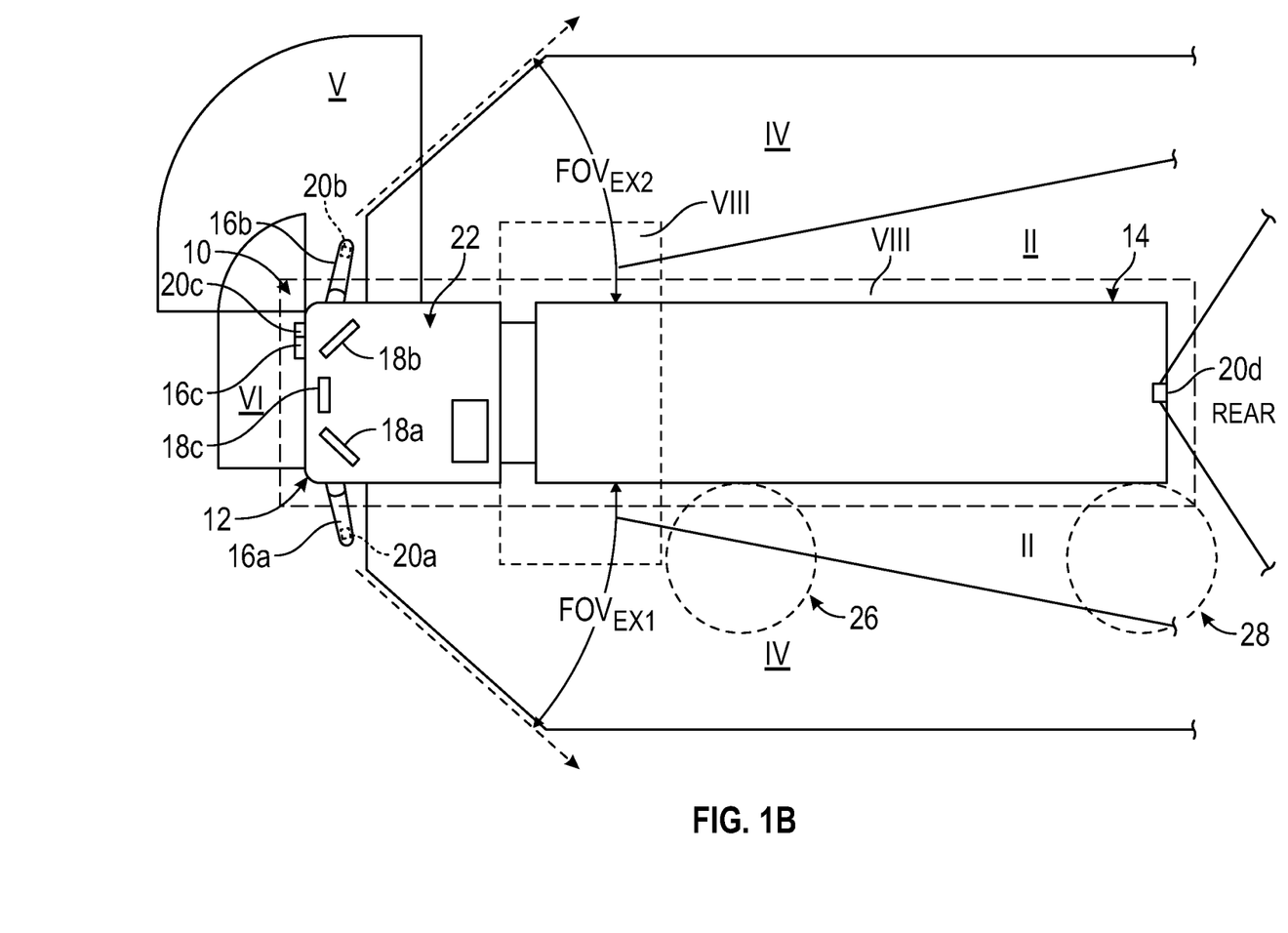
FIG. 1B is a schematic top elevational view of a commercial truck with a camera monitor system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. It should be understood that the vehicle cab 12 and/or trailer 14 may be any configuration. Although a commercial truck is contemplated in this disclosure, the disclosed system may also be applied to other types of vehicles. The vehicle 10 incorporates a camera monitor system (CMS) 30 (FIG. 2) that has driver and passenger side camera arms 16a, 16b (generally, "16") mounted to the outside of the vehicle cab 12. If desired, the camera arms 16a, 16b may include conventional mirrors integrated with them as well, although the CMS 30 can be used to entirely replace side view mirrors. In additional examples, each side can include multiple camera arms 16, with each arm 16 housing one or more cameras and/or mirrors.

Figure 2:
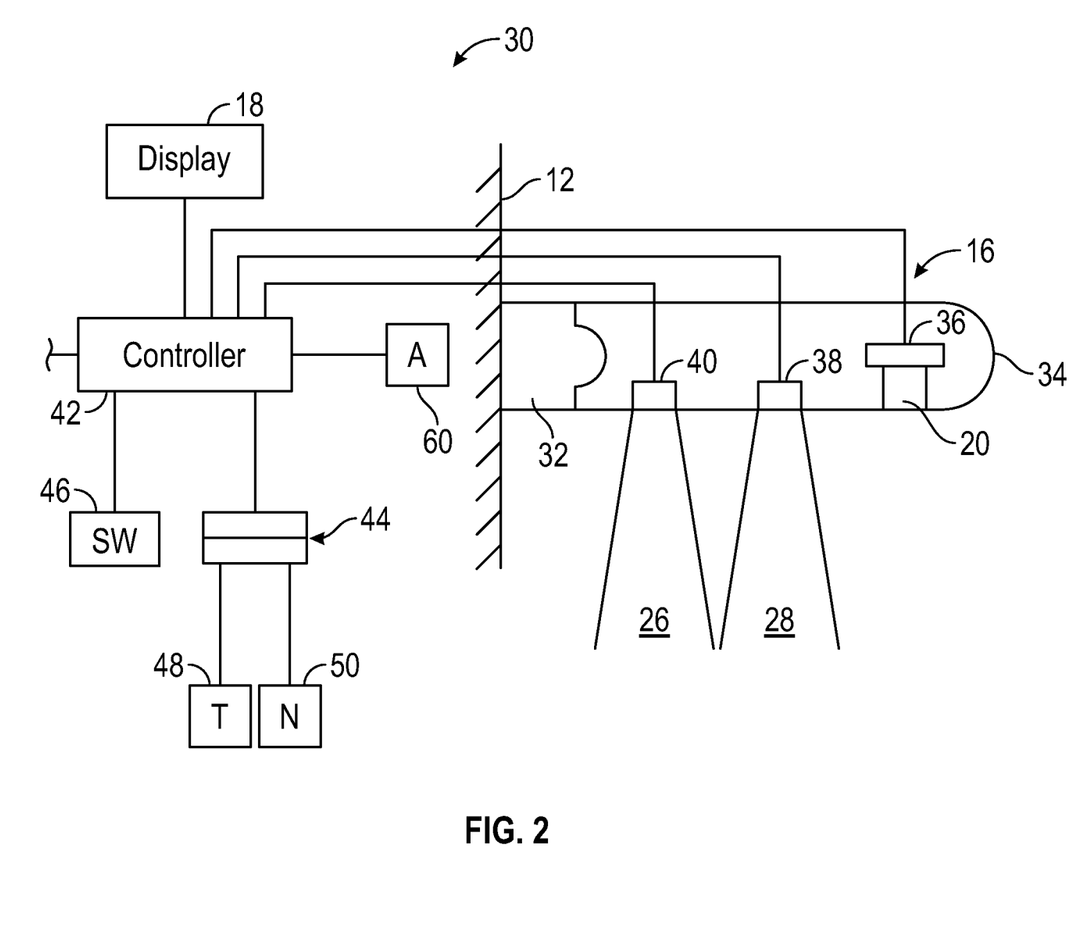
FIG. 2 is a schematic view of a CMS having night vision capability according to the disclosed system and method.

Each of the camera arms 16a, 16b includes a base 32 that is secured to, for example, the cab 12, as shown in FIG. 2. A pivoting arm 34 is supported by the base 34 and may articulate relative thereto either manually or using a power fold mechanism. Returning to FIG. 1B, at least one rearward facing camera 20a, 20b (generally, "20") is arranged respectively within each of the camera arms. The exterior cameras 20a, 20b respectively provide an exterior field of view FOVEX1, FOVEX2 that each include at least one of the Class II and Class IV views (FIG. 1B), which are legal prescribed views in the commercial trucking industry. The Class II view on a given side of the vehicle 10 is a subset of the Class IV view of the same side of the vehicle 10. In one example, both the Class II and Class IV views are provided by a single camera providing a wide-angle view. Multiple cameras also may be used in each camera arm 16a, 16b to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 30.

First and second video displays 18a, 18b (generally, "18") are arranged on each of the driver and passenger sides within the vehicle cab 12 on or near the A-pillars to display Class II and Class IV views on its respective side of the vehicle 10, which provide rear facing side views along the vehicle 10 that are captured by the exterior cameras 20a, 20b. The Class II and Class IV views may be provided by cropping portions of the image from the wide-angle camera.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c (generally, display 18) face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. In such examples, the third display 18c can include one or more frames displaying the Class VIII views. Alternatively, additional displays can be added near the first, second and third displays 18a, 18b, 18c and provide a display dedicated to providing a Class VIII view.

It should be understood that more or fewer displays can be used than schematically illustrated, and the displayed images from more than one camera may be combined on a single display, or an image from a particular field of view may be provided on a separate, discrete display from another image.

The area behind the trailer is a common blind spot for any vehicle, but particularly for commercial trucks. So, it is desirable to provide the operator some awareness of unseen objects at the rear of the trailer using a sensor, such as a camera 20d, as illustrated in FIG. 1B. Challenges to using a camera at the rear of a trailer is the long run of wires that used transmit a video signal to the display in the cab. Dedicated wiring would add significant cost to the system. Additionally, the images must be transmitted with minimal to no latency so objects are displayed in real time.

A night vision system 30 is shown in FIG. 2. The system 30 includes an image capture unit 36 configured to capture a desired field of view for the camera 20. The camera 20 is arranged in the pivotal portion 34 of the camera arm 16 which articulates with respect to the fixed, base portion 32 that is secured to the vehicle cab 12. Also arranged in the camera arm 16 are one or more IR LEDs 38, 40. The IR LEDs may be a single IR LED or an array of multiple IR LEDs that may be regulated together or independently from one another. In one example, the first IR LED array 38 provides one night vision illumination area 28, and the second array 40 provides another IR LED illumination area 26, which may illuminate alongside the vehicle 10 as shown in FIG. 1B. It should be understood that a single IR LED or array of IR LEDs may be used rather than the two arrays schematically shown.

Returning to FIG. 2, a controller 42, which may be arranged within the vehicle cab 12, is in communication with the image capture unit 36 and the IR LEDs 38, 40. The controller 42 may include video processing, which displays the captured image from the image capture unit 36 in a desired format on the display 18, e.g., Class II and Class IV views.

The controller 42 is in communication with various input and output devices. The controller 42 may receive information from the vehicle components through the CAN bus regarding the vehicles operational state. For example, a transmission gear position switch 48 may indicate whether the vehicle is in a forward or reverse gear. A vehicle speed sensor 50 provides vehicle speed information. Another example input device is a switch movable between OFF, AUTOMATIC, and MANUAL positions. In the OFF position, the IR LEDs are switched to an OFF IR LED state and are inoperable. In the MANUAL position, the drive can switch the IR LEDs to an ON IR LED state regardless of whether the IR LEDs would be turned on in the AUTOMATIC operating mode. In the AUTOMATIC position, the controller 42 uses an algorithm 60 described in more detail below and summarized by the method illustrated in FIG. 4.

Figure 3A:
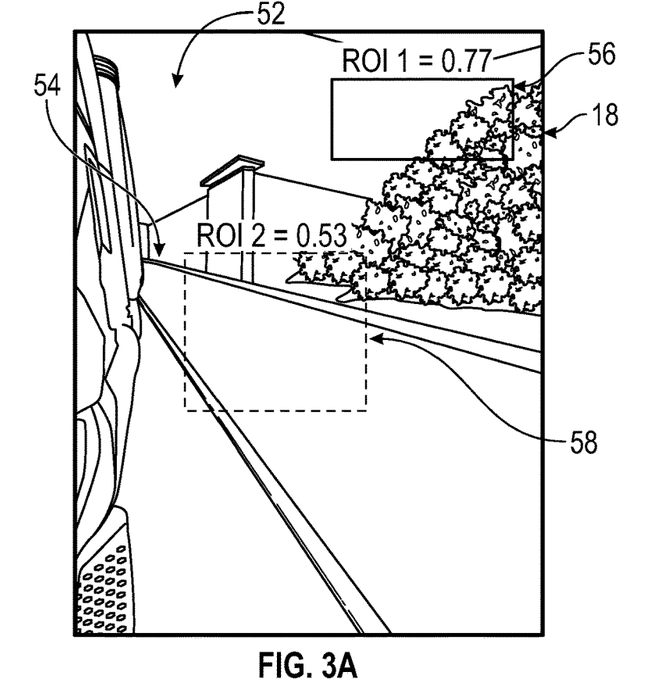
FIGS. 3A and 3B respectively illustrate daytime and nighttime displayed views using an image capture unit having first and second regions of interest.
Figure 3B:
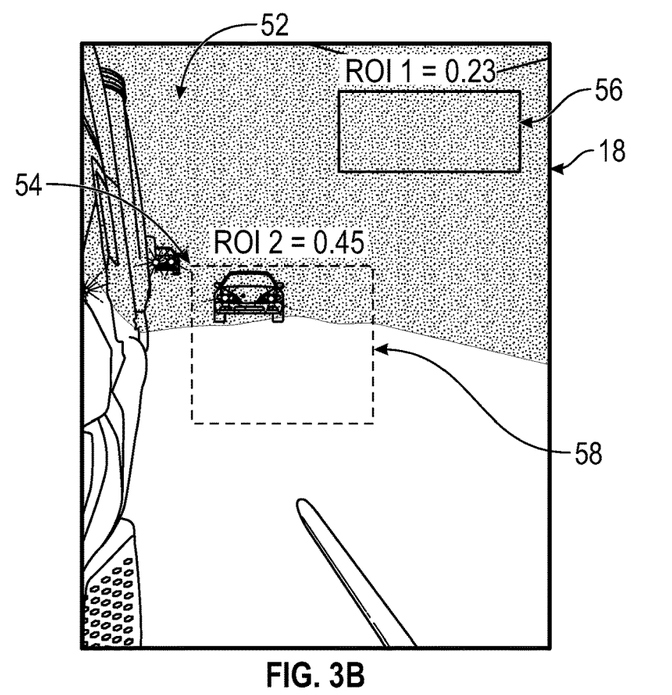

Referring to FIGS. 3A and 3B, the display 18 includes at least two regions of interest (ROI) shown as cropped portions of the same image provided by the image capture unit 36. These regions would not be shown on the display; rather, FIGS. 3A and 3B illustrate where the regions might be located to provide the described functionality. More than two ROIs may be used if desired. The controller 42 is configured to determine an average luminance of each of said first and second ROIs 56, 58. The luminance values may be normalized between 0 and 1, where 0 is pitch black and 1 is full light. An intermediate value of 0.5 may be used as the as a dividing point between day time and night time, for example. The 0.5 value may also be used to determine whether there may be oversaturation at night, for example, if the luminance is below 0.5 in the second ROI 58 at night. Other values may be used if desired.

The first and second ROIs 56, 58 respectively provide portions of the image above the horizon and skyward and aftward alongside the vehicle, for example, along the trailer 14. The first ROI 56 is intended to provide an indication of the amount of ambient light, i.e., daytime or nighttime. In the examples shown, an average of the luminance in the portion of the captured image within the first ROI 56 is 0.77 (FIG. 3A) indicating daytime, whereas a value of 0.23 (FIG. 3B) indicates nighttime. The second ROI 58 is intended to capture lighting that may saturate any images or objects in the field of view when the IR LEDs are ON, for example, by a vehicle with headlights are overtaking the tractor/trailer.

With the switch 46 in the AUTOMATIC position, the controller 42 is configured to regulate an IR LED state of the IR LEDs 38 and/or 40 based upon the first ROI luminance. That is, the IR LEDs will be ON at nighttime and OFF during the day. The IR LEDs ON time may be limited based upon various use cases, if desired, for example, when the tractor/trailer is in reverse or going at speeds below 5-10 mph. As a further example, both IR LEDs 38, 40 may be used when in reverse and docking for improved visibility, while only one of the IR LEDs may be used when the vehicle is traveling forward.

When the IR LEDs are ON, the controller 42 is configured to adjust the IR LED state based upon the second ROI luminance, for example, turn the some or all of the IR LEDs OFF or reduce the power to the IR LEDs so they are not fully ON.

Figure 4:
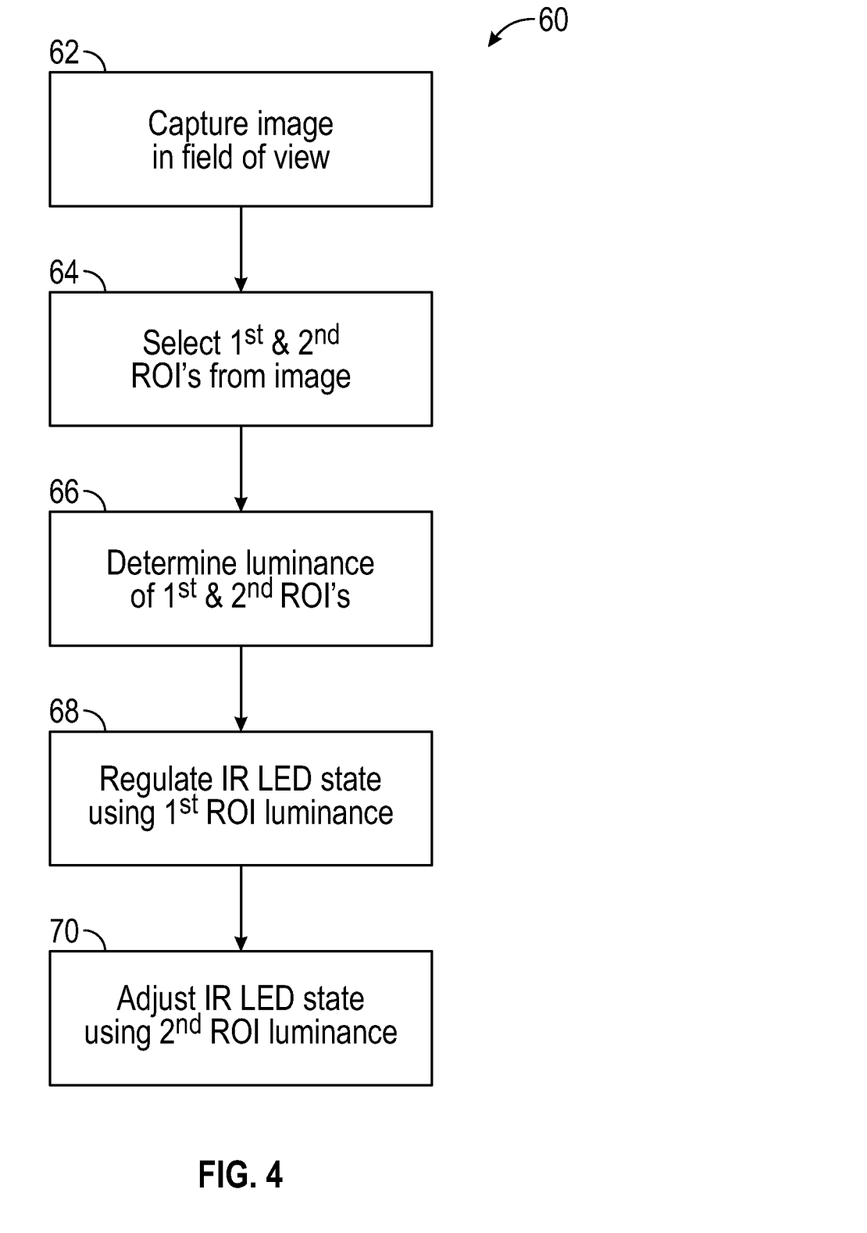
FIG. 4 is an example method for controlling IR LEDs using information from the first and second regions of interest.

A method 60 or algorithm of automatically controlling the vehicle night vision system is shown in FIG. 4. An image in a desired field of view is captured (block 62). The desired field of view includes both Class II and Class IV views. At least first and second regions of interest (ROI) are selected (e.g., by cropping from a common image) from the captured image (block 64), wherein the first ROI is indicative of an amount of ambient light. It should be understood that the first and second ROIs need not be captured using a single camera; one or more cameras may be used. The second ROI is positioned to pick up lighting from sources such as passing vehicles that could result in oversaturation.

A luminance of each of said first and second ROIs is determined (block 66). In one example, the image capture unit is configured to capture an RGB image. The controller is configured to convert the RGB image of the first and second ROIs to HSV (Hue, Saturation, Value). The Value (V) is used for luminance. One example conversion formula is provided per the following:

The R, G, B values are divided by 255 to change the range from 0 ... 255 to 0 ... 1:

$$R'=R/255$$

$$G'=G/255$$

$$B'=B/255$$

$$C_{max}=\max(R',G',B')$$

$$C_{min}=\min(R',G',B')$$

$$\Delta=C_{max}-C_{min}$$

Hue calculation:

$$H = \begin{cases} 0° & \Delta = 0 \\ 60° \times \left(\frac{G'-B'}{\Delta}\bmod 6\right) & ,C_{max}=R' \\ 60° \times \left(\frac{B'-R'}{\Delta}+2\right) & ,C_{max}=G' \\ 60° \times \left(\frac{R'-G'}{\Delta}+4\right) & ,C_{max}=B' \end{cases}$$

Saturation calculation:

$$S = \begin{cases} 0 & ,C_{max}=0 \\ \frac{\Delta}{C_{max}} & ,C_{max} \neq 0 \end{cases}$$

Value calculation:

$$V=C_{max}$$

In one example, the RGB to HSV is done for each pixel in each ROI, and the median V for each ROI is computed to determine the luminance (0 to 1 value) for the particular ROI at that given moment.

A low pass filter is applied to the HSV Value for each of the first and second ROIs, which filters out high frequency noise or fluctuations in V over time. In one example, the low pass filter for each of the first and second ROIs is different from one another. For example, the second ROI used to detect sources of oversaturation may have a lighter low pass filter than the V from the first ROI because the second ROI's V will likely change more quickly than that derived from the first ROI.

The filtered V for each ROI is ultimately used to determine the luminance in the ROI for regulating the IR LED states. The IR LED state is regulated by changing IR LED state only if the HSV Value exceeds an offset from the desired luminance, providing a hysteresis. For example, the IR LEDs automatically may be switched ON and OFF based the V of the first ROI, i.e., controlling the IR LEDs based upon day and nighttime ambient light (block 68). So, the IR LEDs may be switched OFF above 0.5 V in the first ROI, or switched ON below 0.5 V in the second ROI. However, to avoid excessive ON/OFF around 0.5 V, an offset of 0.2 may be used, such that once ON, the IR LEDs are switched off when reaching 0.3 V. Similarly, once the IR LEDs are OFF, they might only be switched ON when reaching 0.7 V. Further regulation of the IR LED state based upon the oversaturation detection of the second ROI (block 70) may employ a different hysteresis, e.g., an offset of 0.1 V so that IR LED regulation is more active based upon the luminance of second ROI.

It should be understood that the IR LEDs need not only operate in the ON/OFF states. That is, the controller may change an amount of IR LED illumination other than an entirely ON IR LED state or an entirely OFF IR LED state. For example, in oversaturation conditions detected in the second ROI, the controller 42 can reduce the power of the IR LEDs, for example, from 100% power to 30%, 50% or 70% power.

The controller 42 can be used to implement the various functionality disclosed in this application. The controller 42 may include one or more discrete units. Moreover, a portion of the controller 42 may be provided in the vehicle, while another portion of the controller 42 may be located elsewhere. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 42 may be a hardware device for executing software, particularly software stored in memory. The controller 42 can be a custom made or commercially available processor, a central processing unit (CPU), an auxiliary processor among several processors associated with the controller 42, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a display, macroclimate device, microclimate device, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 42 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera monitor system comprising:
a camera arm having a camera with an image capture unit configured to capture an image of a desired field of view;
a display configured to display the desired field of view;
an infrared light-emitting diode (IR LED) configured to illuminate at least a portion of the desired field of view; and
a controller in communication with the image capture unit and the IR LED, the controller configured to select at least first and second regions of interest (ROI) from the captured image, wherein the first and second ROIs correspond to different first and second portions of the same captured image, wherein the first ROI is indicative of an amount of ambient light, and the first ROI is above a horizon and skyward in the desired field of view, and the second ROI is rearward alongside a vehicle having the camera monitor system, the controller configured to determine a luminance of each of said first and second ROIs, the controller configured to regulate an IR LED state of the IR LED based upon the first ROI luminance, and the controller configured to adjust the IR LED state based upon the second ROI luminance.

2. The system of claim 1, wherein the image capture unit is configured to capture an RGB image, and the controller is configured to convert the RGB image of the first and second ROIs to a hue, saturation, and value color model (HSV).

3. The system of claim 1, wherein the controller is configured to turn the IR LED to an ON state from an OFF state of the IR LED, or to an OFF state from the ON state.

4. The system of claim 1, wherein the controller is configured to change an amount of IR LED illumination other than an entirely ON IR LED state or an entirely OFF IR LED state.

5. The system of claim 1, wherein the controller is configured to regulate the IR LED state based upon a vehicle operating state, and comprising a switch having AUTOMATIC and MANUAL positions, wherein the controller is configured to regulate the IR LED state in response to the switch being in the AUTOMATIC position.

6. A method of automatically controlling a vehicle night vision system comprising the steps of:
- capturing an image in a desired field of view with at least one image capture unit;
- selecting with a controller at least first and second regions of interest (ROI) from the captured image, wherein the first and second ROIs correspond to different first and second portions of the same captured image, and the first ROI is above a horizon and skyward in the desired field of view, and the second ROI is rearward alongside a vehicle having the image capture unit;
- determining with the controller a luminance of each of said first and second ROIs, wherein the first ROI is indicative of an amount of ambient light;
- regulating with the controller an IR LED state of an IR LED based upon the first ROI luminance;
- adjusting the IR LED state based upon the second ROI luminance.

7. The method of claim 6, wherein the desired field of view includes both Class II and Class IV views.

8. The method of claim 6, wherein the image capturing step includes capturing an RGB image, and the luminance determining step includes converting the RGB image of the first and second ROIs to HSV (Hue, Saturation, Value).

9. The method of claim 8, wherein the luminance determining step includes calculating a median of the Value.

10. The method of claim 9, wherein the luminance determining step includes applying a low pass filter to the Value for each of the first and second ROIs.

11. The method of claim 10, wherein the low pass filter for each of the first and second ROIs is different from one another.

12. The method of claim 10, wherein the luminance determining step includes comparing the HSV Value to a desired luminance, and the IR LED state regulating step includes changing IR LED state only if the Value exceeds an offset from the desired luminance.

13. The method of claim 6, wherein the IR LED state regulating step includes automatically turning the IR LED to an ON state or an OFF state.

14. The method of claim 13, wherein the IR LED state adjusting step includes turning the IR LED to an ON state from an OFF state of the IR LED, or to an OFF state from an ON state.

15. The method of claim 13, wherein the IR LED state adjusting step includes changing an amount of IR LED illumination other than an entirely ON state or an entirely OFF state of the IR LED.

16. The method of claim 6, wherein the IR LED state regulating step is performed based upon a vehicle operating state.

17. The method of claim 6, comprising a switch having AUTOMATIC and MANUAL positions, wherein the IR LED state regulating step is performed in response to the switch being in the AUTOMATIC position.

* * * * *